United States Patent
Chapman

(10) Patent No.: US 7,324,515 B1
(45) Date of Patent: Jan. 29, 2008

(54) PROXY ADDRESSING SCHEME FOR CABLE NETWORKS

(75) Inventor: John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1289 days.

(21) Appl. No.: 10/109,456

(22) Filed: Mar. 27, 2002

(51) Int. Cl.
*H04L 12/56* (2006.01)

(52) U.S. Cl. .................. 370/392; 370/474; 370/487

(58) Field of Classification Search .............. None
See application file for complete search history.

(56) References Cited

U.S. PATENT DOCUMENTS

| | | | |
|---|---|---|---|
| 5,918,019 A | 6/1999 | Valencia | |
| 6,118,768 A * | 9/2000 | Bhatia et al. | 370/254 |
| 6,137,793 A | 10/2000 | Gorman et al. | |
| 6,819,682 B1 | 11/2004 | Rabenko et al. | |
| 7,065,779 B1 | 6/2006 | Crocker et al. | |
| 7,113,484 B1 | 9/2006 | Chapman et al. | |
| 7,134,131 B1 * | 11/2006 | Hendricks et al. | 725/31 |
| 7,139,923 B1 | 11/2006 | Chapman et al. | |
| 2001/0030975 A1 * | 10/2001 | Limb et al. | 370/465 |
| 2002/0023174 A1 * | 2/2002 | Garrett et al. | 709/245 |
| 2002/0052927 A1 | 5/2002 | Park | |
| 2002/0093955 A1 | 7/2002 | Grand et al. | |
| 2002/0112175 A1 * | 8/2002 | Makofka et al. | 713/200 |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2004/0163129 A1 | 8/2004 | Chapman et al. | |
| 2004/0244043 A1 | 12/2004 | Lind et al. | |
| 2005/0265376 A1 | 12/2005 | Chapman et al. | |
| 2005/0265392 A1 | 12/2005 | Chapman et al. | |
| 2005/0265397 A1 | 12/2005 | Chapman et al. | |
| 2006/0168612 A1 | 7/2006 | Chapman et al. | |

FOREIGN PATENT DOCUMENTS

WO   00/72509   11/2000

OTHER PUBLICATIONS

Cable Television Laboratories, Inc., "DOCSIS Set-top Gateway (DSG) Interface Specification", 2001, pp. 1-19.

Postel, J., "User Datagram Protocol", RFC 768, Aug. 28, 1980, 3 pgs.

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.

(Continued)

*Primary Examiner*—Brian Nguyen
(74) *Attorney, Agent, or Firm*—Stolowitz Ford Cowger LLP

(57) ABSTRACT

A proxy in a cable modem termination system receives IP packets having an address associated with set top box out of band messages. The proxy encapsulates the packets in an Ethernet frame containing an Ethernet address. A cable modem associated with the set top box is preconfigured to detect the Ethernet encapsulated packets and pass the out of band messages in the packets to the set top box.

16 Claims, 6 Drawing Sheets

OTHER PUBLICATIONS

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC 3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13.

Adoba, et al., Extensible Authentication Protocol (EAP), RFC 3748, Jun. 2004, pp. 1-64, Standards Track.

ITU-T Telecommunication Standardization Sector of ITU, Series J: Cable Networks And Transmission of Television, Sound Programme And Other Multimedia Signals, Interactive Systems For Digital Television Distribution, Recommendation J.122, Dec. 2002, 506 pages, International Telecommunication Union.

* cited by examiner

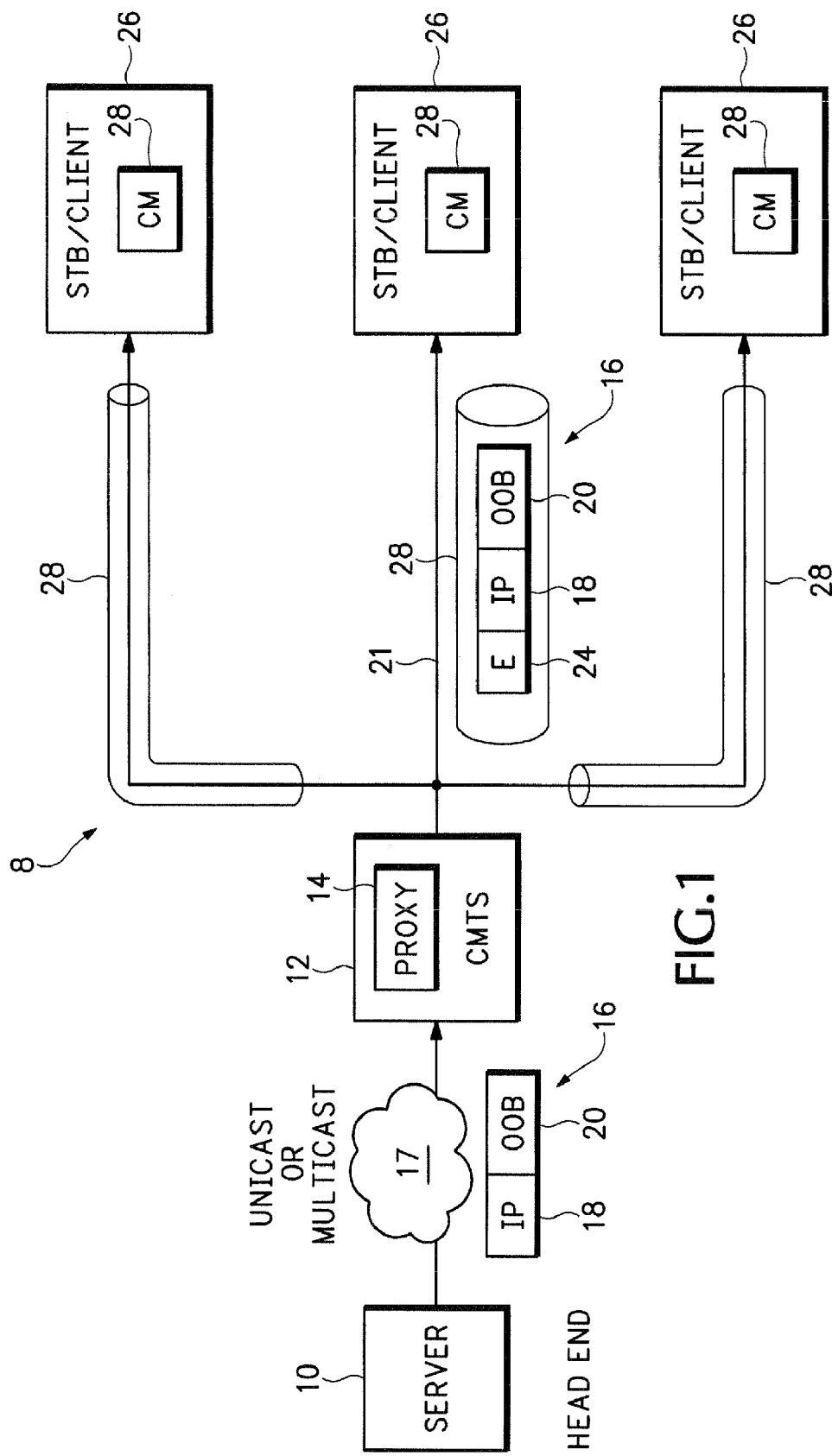

PROXY ADDRESSING SCHEME FOR CABLE NETWORKS

BACKGROUND

A set top box (STB) is a device that converts digital MPEG-TS and encrypted video into an analog format that can be viewed on a standard television. The set top box provides subscription and pay-per-view broadcast television services and interactive TV services. The STB is controlled from a multi-system operator (MSO) head end through an out of band (OOB) channel. The OOB channel is part of a proprietary structure each cable services vendor uses for transmitting emergency messaging, electronic program guides, software updates, etc. to the STBs. The proprietary structure includes the signaling or data transfers necessary for communicating between a STB server and the STB.

A proposal has been suggested for using a data over cable service interface specifications (DOCSIS) cable modem to replace the OOB channel in the cable network. The DOCSIS cable modem provides Internet protocol (IP) services over a cable network. The problem is that some existing STBs operate with one-way cable plants that receive OOB messages over an OOB downstream channel but provide no upstream return OOB channel. The DOCSIS system, on the other hand, is a two-way protocol that requires a downstream and upstream communication channel.

The DOCSIS cable modems currently work independently with existing STBs. However, this requires five separate tuners at the STB location. Three tuners for the downstream video channels, OOB channel and the DOCSIS channel; and two tuners for the OOB and DOCSIS upstream channels.

The present invention addresses this and other problems associated with the prior art.

SUMMARY OF THE INVENTION

A proxy in a cable modem termination system receives IP packets having an address associated with set top box out of band messages. The proxy encapsulates the packets in an Ethernet frame containing an Ethernet address. A cable modem associated with the set top box is preconfigured to detect the Ethernet encapsulated packets and pass the out of band messages in the packets to the set top box.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a block diagram of a proxy scheme used in a cable network.

DETAILED DESCRIPTION

Figure 2A:
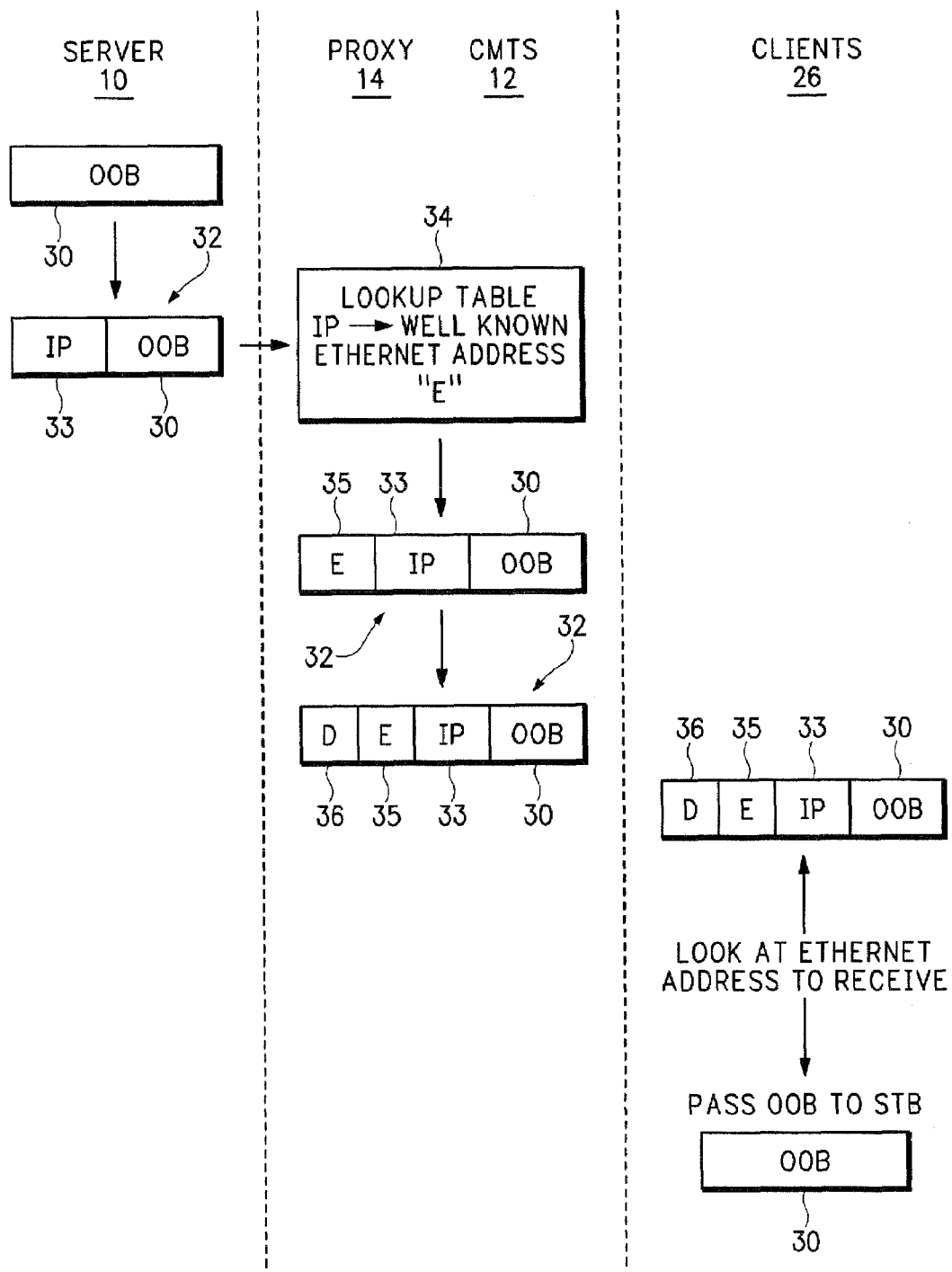
FIG. 2A is a diagram showing how the proxy scheme in FIG. 1 creates an Ethernet tunnel for sending OOB messages over a one-way or two-way cable plant.

One or more servers 10 send packets 16 through an IP network 17 to a cable modem termination system (CMTS) 12. The CMTS 12 is coupled through a hybrid fiber coax (HFC) 21 to multiple clients 26 in the cable network 8. The CMTS 12 includes a proxy 14 that forwards IP packets 16 from the IP network 17 to clients 26 in the cable network 8. The clients 26 can be any combination of set top boxes (STBs), computers, residential gateways, customer premise equipment (CPE) or any other electronics in the cable network that receive data from the server 10.

The server 10 can also be any router, switch, computer, or other network processing device that needs to send IP packets 16 to one or more of the clients 26 in the cable network. For example, the server 10 can send generic IP packets to a computer at one of the clients 26. In the example shown in FIG. 1, the server 10 sends packet 16 that contains an out of band (OOB) message 20 destined for multiple STBs at the clients 26.

Out of band messages typically comprise conditional access messages including entitlements, system information messages, electronic program guide (EPG) messages, emergency alert system messages or any other messages that can be understood by a set top box. The OOB messages previously have been transmitted over a separate OOB channel in the HFC 21. The OOB messages are typically proprietary to particular cable service providers, such as the proprietary messages used in Scientific America cable equipment or the proprietary messages used in General Instruments cable equipment. However, OOB messages 20 can be sent by the proxy 14 in generic IP packets over a DOCSIS channel in the HFC 21 to any cable equipment device.

The packet 16 is sent from the server 10 to one or more CMTSs 12. The proxy 14 terminates the IP connection from the server 10 and provides any two-way handshaking that may be required by the server 10. The proxy 14 can support Resource Reservation Setup Protocol (RSVP), Multiprotocol label switching (MPLS), and other IP quality of service (QoS) mechanisms. The proxy 14 can provide any protocol feed back required by RTCP, Realtime Streaming Protocol (RTSP), handshaking, etc.

The packet 16 can be unicast or multicast packet. In the case of multicasting, the proxy 14 provides the Internet control message protocol (ICMP) for the multicast session, and terminates the session. The use of multicasting allows the server 10 to generate less packets per second when addressing a large number of CMTSs 12.

A single IP address 18 is used by the server 10 to send the OOB message 20 to multiple STBs at the clients 26 that have no associated IP addresses. The proxy 14 is programmed to look for a particular IP address value 18 associated with OOB message 20. The proxy 14 upon detecting the predefined IP address 18, replaces an Ethernet address in the packet 16 with a well-known Ethernet address 24. A well-known Ethernet address is defined as an Ethernet address value that is preconfigured into cable modems (CM) 28 at clients 26. The cable modems 28 upon detecting the well-known Ethernet address are alerted that the packet 18 contains an OOB message.

The proxy 14 encapsulates the packet 16 in an Ethernet frame that effectively creates a DOCSIS broadcast tunnel 28 in the HFC 21 to all of the clients 26. The DOCSIS broadcast tunnel 28 is alternatively referred to as an Ethernet tunnel. The tunnel 28 transports the OOB packet 16 to the clients 26 independently of the DOCSIS IP protocol typically used for transporting IP packets over the cable network 8. This allows IP packet 16 to be sent to multiple clients 26 in the cable network 8 that may not have IP addresses and that only operate in one-way cable plants. Proprietary formatting in the OOB messaging 20 contained in the packet 16 is also preserved allowing operation with legacy cable plants.

The CMTS 12 cannot access a destination address for the CM 28 in a one-way cable plant. A one-way cable plants refers to clients 26, such as certain set top boxes, that can only receive downstream data from the CMTS 12 and do not send data upstream back to the CMTS 12. The DOCSIS protocol requires two-way IP communication over the cable network 8. However, by using the well-known Ethernet address 24, the proxy 14 can send DOCSIS packet 16 containing OOB message 20 over a one-way cable plant.

Prior to initiating upstream communications, DOCSIS cable modems 28 typically receive timestamps, MAPS, and UCD messages over a downstream channel in the HFC 21. The proxy 14 exploits this downstream initialization process of the DOCSIS protocol to send IP packet 16 to clients 26.

The cable modems (CMs) 28 include filters that are pre-configured to receive Ethernet data frames having the well-known Ethernet address without having to go through the entire two-way DOCSIS cable modem initialization process. Each set top box/cable modem manufacturer is assigned one or more Ethernet addresses. One of these Ethernet addresses is the well-known Ethernet address 24 used in packet 16. The packets are received without the CMs 28 having to send any acknowledgements or handshaking initialization signaling back to the CMTS 12. The OOB message 20 in the packet 16 after being processed by the CM 28 is delivered either to a STB client 54 (FIG. 5) or to a plug in "POD" in the client 26.

FIG. 2A shows in further detail how an OOB message 30 is sent from the server 10 to multiple cable clients 26. The OBB message 30 is formatted into an IP packet 32 and sent to the CMTS 12. The proxy 14 in the CMTS 12 uses a lookup table 34 to determine the IP address 33 associated with an OOB message and to identify the well-known Ethernet address 35 associated with the IP address 33.

The proxy 14 performs a MAC level rewrite that replaces a destination MAC address in the packet 32 (not shown) with the well-known Ethernet address 35 identified in table 34. The proxy 14 attaches a DOCSIS IP header 36 to the packet 32 and then sends the packet to the multiple clients 26 on the HFC 21 (FIG. 1). In one embodiment, the IP address 33 is left unaltered in the packets 32 sent over the HFC 21. But the IP address 33 in one implementation has no further function after being received by the proxy 14.

Figure 3:
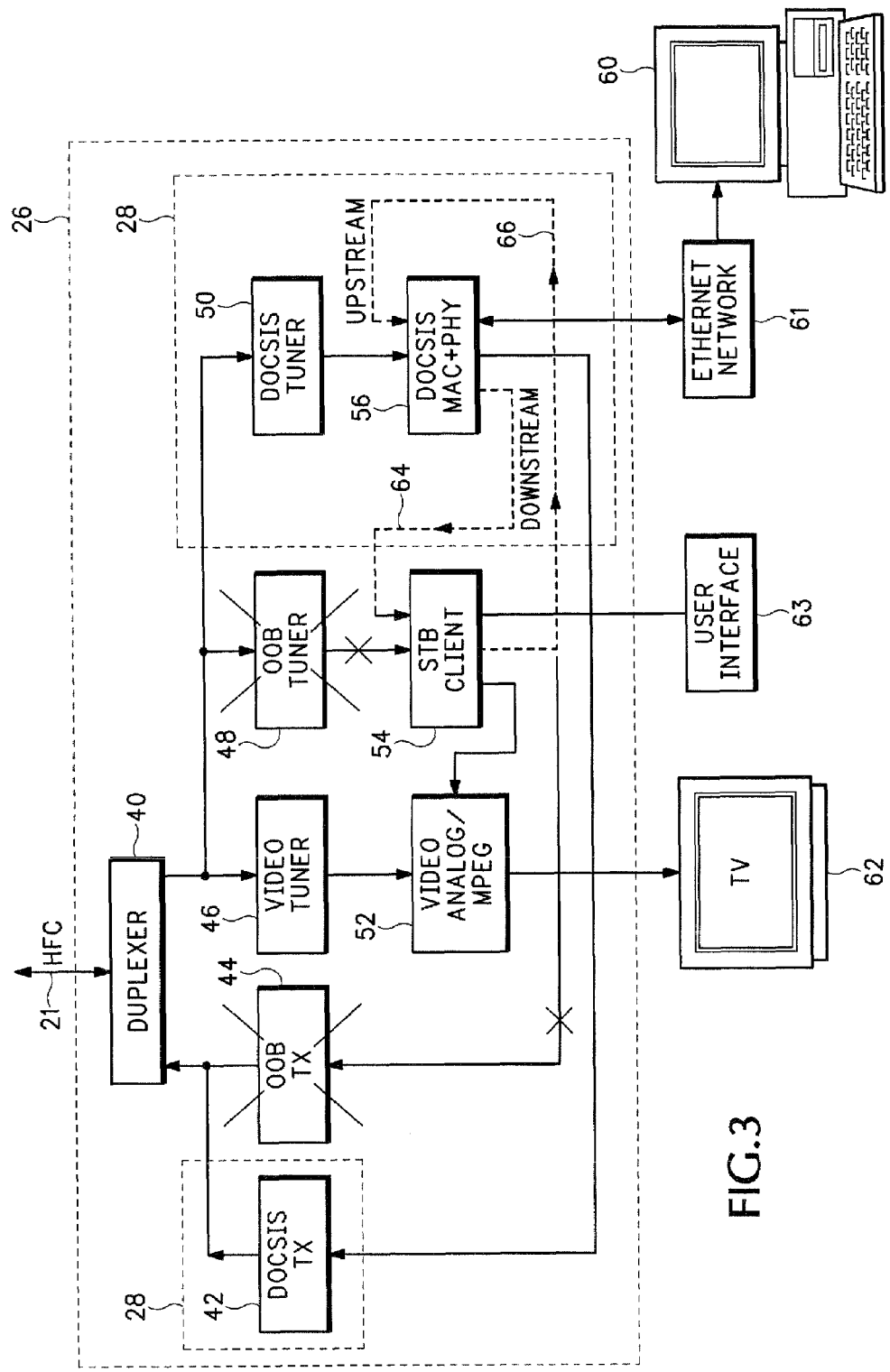
FIG. 3 is a detailed diagram of a cable client that operates with the proxy scheme shown in FIG. 1.

The DOCSIS cable modems 28 at the clients 26 look for the well-known Ethernet address 35. The CMs 28 upon detecting the well-known Ethernet address 35 send the OOB message 30 to an STB client 54 (FIG. 3). If the CM 28 does not detect the Ethernet address 35, the packet 32 is processed like any typical DOCSIS IP packet.

Figure 2B:
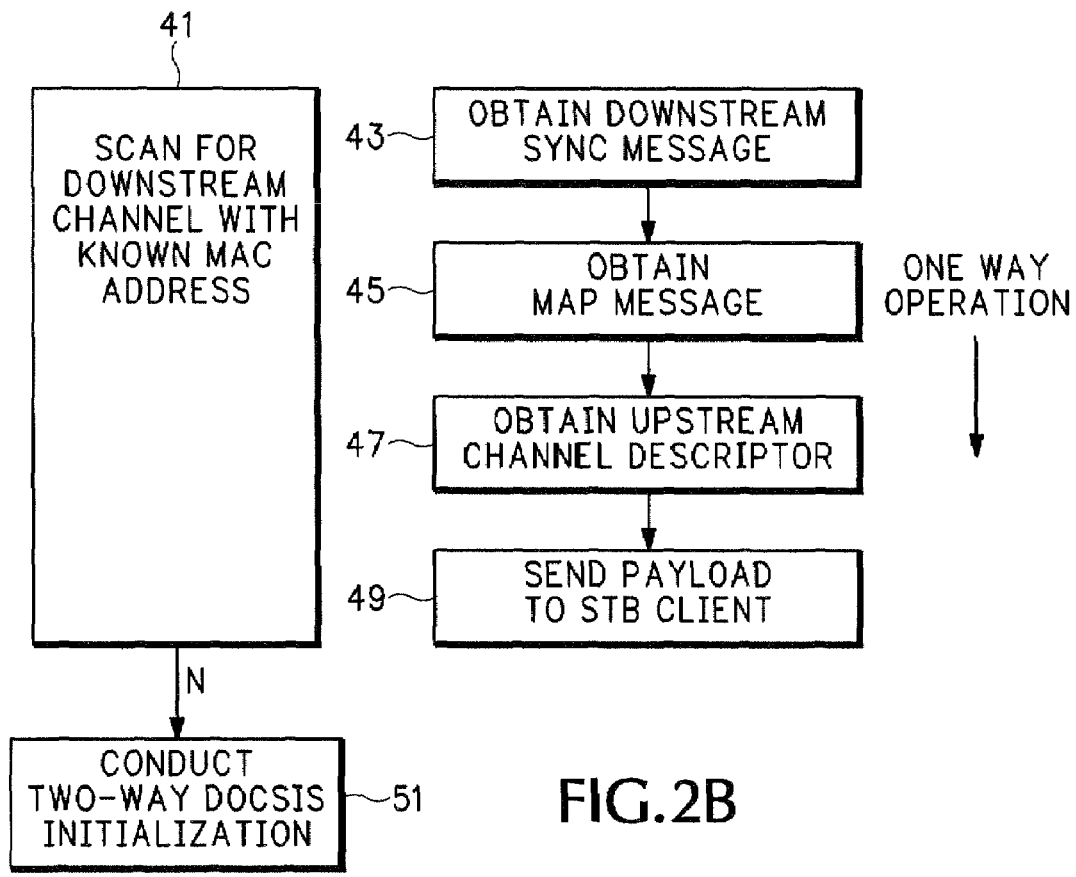
FIG. 2B is a flow diagram showing how a DOCSIS cable modem is configured to receive OOB message packets.

FIG. 2B shows the modified process that the DOCSIS cable modems use for receiving OOB packets. The cable modem scans for the DOCSIS downstream channel in block 41. If the well-known Ethernet address is detected, the cable modem proceeds with one-way initialization in blocks 43, 45, and 47. If a packet is detected that does not contain the well-known Ethernet address, the cable modem conducts normal two-way DOCSIS initialization in block 51.

In block 43, the cable modem looks for a sync message providing a clock sync for synchronizing the cable modem to a timestamp count at a cable network head-end. The cable modem obtains a map message in block 45 that indicates when the cable modem can transmit in the upstream, if applicable. The cable modem obtains the upstream channel descriptor in block 47 that indicates what frequency, modulation profile, and other layer one parameters to use for initializing an upstream transmitter. In block 49, the OOB message in the packet payload is sent to an STB client. All of the operations in blocks 43, 45, and 47 are currently received by the DOCSIS cable modem. However, other conventional DOCSIS initialization steps are not performed by the cable modem when the well-known Ethernet address is detected.

FIG. 3 is a detailed diagram of one of the clients 26 in the cable network. A diplexer 40 separates the upstream and downstream channels on the HFC 21. The diplexer 40 receives and transmits both video, OBB messages and DOCSIS signaling over the HFC 21. A video tuner 46 demodulates a video channel and a video analog/MPEG converter 52 converts the video signals into analog signals for outputting to a television 62.

A DOCSIS cable modem 28 includes a DOCSIS tuner 50, a DOCSIS transmitter 42, and DOCSIS interface circuitry 56. The DOCSIS tuner 50 receives the OOB messages via DOCSIS IP packet 16 (FIG. 1) sent over the DOCSIS down steam channel of the HFC 21. The DOCSIS tuner 50 also receives other general two-way DOCSIS IP packets transported over the same DOCSIS channel in the HFC 21.

In conventional STBs, an OOB tuner 48 demodulates an OOB channel in the HFC 21 and supplies demodulated OOB messaging to a STB client 54. However, the proxy scheme described above allows the OOB tuner 48 to be eliminated from the client 26.

The demodulated signals from the DOSCIS tuner 50 are sent to the DOCSIS interface 56. The DOCSIS interface 56 includes a physical interface layer (PHY) and a media access control (MAC) layer. The DOCSIS interface 56 looks for the well-known Ethernet address 24 (FIG. 1) in the received packets to determine if the packet is a proxy based OOB message.

The DOCSIS interface 56 sends OOB messages in IP packets containing the well-known Ethernet address to the STB client 54 over downstream path 64. For example, the OOB message in the IP packet may contain an emergency notification message or an electronic programming guide message. If the OOB message needs to be output to the TV 62, the STB client 54 outputs the message to the signal converter 52. The signal converter 52 then outputs analog signals for the message to the television 62.

The STB client 54 can include multiple circuits that each process a different type of OOB message. For example, one STB client 54 may only process emergency notification messages. A second STB client 54 may only process electronic program guide messages. The DOCSIS interface 56 sends the different OOB messages to these different STB clients 54 according to the well-known Ethernet address in the IP packet.

For example, a first well-known Ethernet address may be associated with the emergency notification messages and a second well-known Ethernet address may be associated with conditional access messages. The DOCSIS interface 56 sends data in packets containing the first well-known Ethernet address to a first STB client that processes the emergency notification messages. The DOCSIS interface 56 sends all IP packets containing the second well-known Ethernet address to a second STB client 54 that processes the conditional access messages.

In another implementation, there may be a single STB client 54 that handles multiple different OOB messages. In still another embodiment, the DOCSIS interface 56 sends all OOB messages to a single STB client 54 which then identifies one of multiple STB subcircuits to forward the OOB message.

In existing STBs, a separate OOB transmitter 44 is needed for transmitting OOB signaling from the STB client 54 to the CMTS 12 (FIG. 1). By using the proxy scheme described above, the OOB transmitter 44 can also be eliminated. Any OOB messages that need to be transmitted through an upstream channel of the HFC 21 back to the server 10 (FIG. 1) are first sent through a downstream path 66 to the DOCSIS interface 56. The DOCSIS interface 56 formats the OOB message into a DOCSIS IP packet with the destination address of the server 10. The OOB packet is then sent from the DOCSIS interface 56 to the DOCSIS transmitter circuit 42 and then transmitted through the upstream DOCSIS channel of HFC 21.

For example, the STB client 54 may receive a signal from a TV user over a user interface 63 selecting a pay per view movie. The user interface 63 can be buttons on the STB or signals received from a remote control device. The STB client 54 processes the user selections and sends the data to the DOCSIS interface 56 over upstream path 66. The pay-per-view movie message is formatted into a DOCSIS IP packet and sent by transmitter 42 over the DOCSIS upstream channel of the HFC 21 to the CMTS 12. The CMTS 12 then forwards the IP packet to the appropriate pay per view server in the IP network.

The DOCSIS cable modem 28 can also be used for providing interactive IP services, other than OOB messaging. For example, interactive gaming or other streaming video signals can be sent from a server over the IP network 17 (FIG. 1) to a particular DOCSIS CM address. The data in the interactive gaming or streaming video packets is received by the DOCSIS interface 56 and output through the STB client 54 to the TV 62. Any responses from a user to the displayed data is received through the user interface 63 and passed by the STB client 54 to the DOCSIS interface 56. The DOCSIS interface 56 then formats the user responses into DOCSIS packets that are transmitted over the DOCSIS upstream channel through transmitter 42.

Any other general IP packets received over the DOCSIS interface 56, for example, any packets that do not include the well-known Ethernet address, are output over an Ethernet network 58 to a computer 60. Whenever the computer 60 needs to send IP packets, the data is first formatted by the DOCSIS interface 56, then sent by the DOCSIS transmitter 42 over the upstream DOCSIS channel of the HFC 21.

The DOCSIS cable modem 28 including the DOCSIS tuner 50, DOCSIS transmitter 42, and DOCSIS interface 56 can be located within the same enclosure that contains the video tuner 46, video converter 52, and STB client 54. Alternatively, the DOCSIS cable modem circuitry 28 can be located in a standalone device that connects into an IP interface on the set top box.

Figure 4:
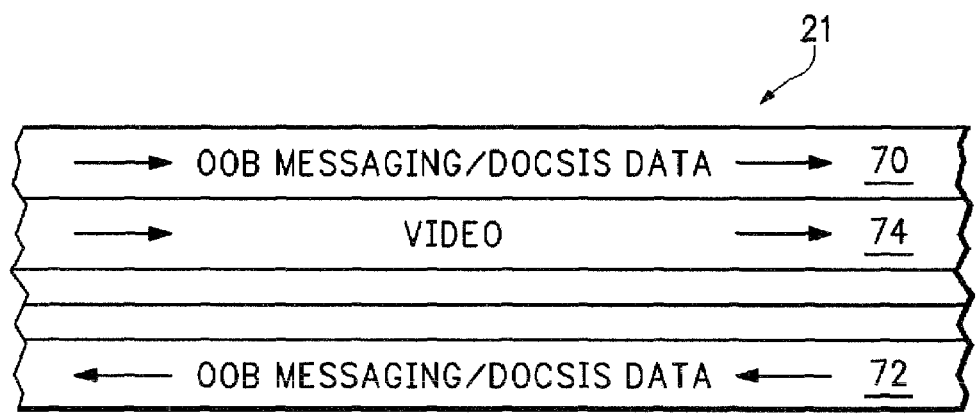
FIG. 4 is a diagram showing how data is transferred over downstream and upstream channels in a hybrid fiber coax (HFC) cable.

FIG. 4 is a diagram showing the different channels in the HFC 21. Video data is transmitted from a head-end to the clients 26 over a downstream video channel 74. The proxy scheme described above allows both OOB messages and other DOCSIS IP data to be transmitted over the same downstream channel 70. Similarly, upstream OOB messages and upstream DOCSIS IP data are both sent over the same upstream channel 72. Upstream OOB packets are routed to the OOB server associated with a destination address in the IP packet. Other upstream DOCSIS traffic is routed to other endpoints in the IP network associated with the destination address in the IP packet.

Figure 5:
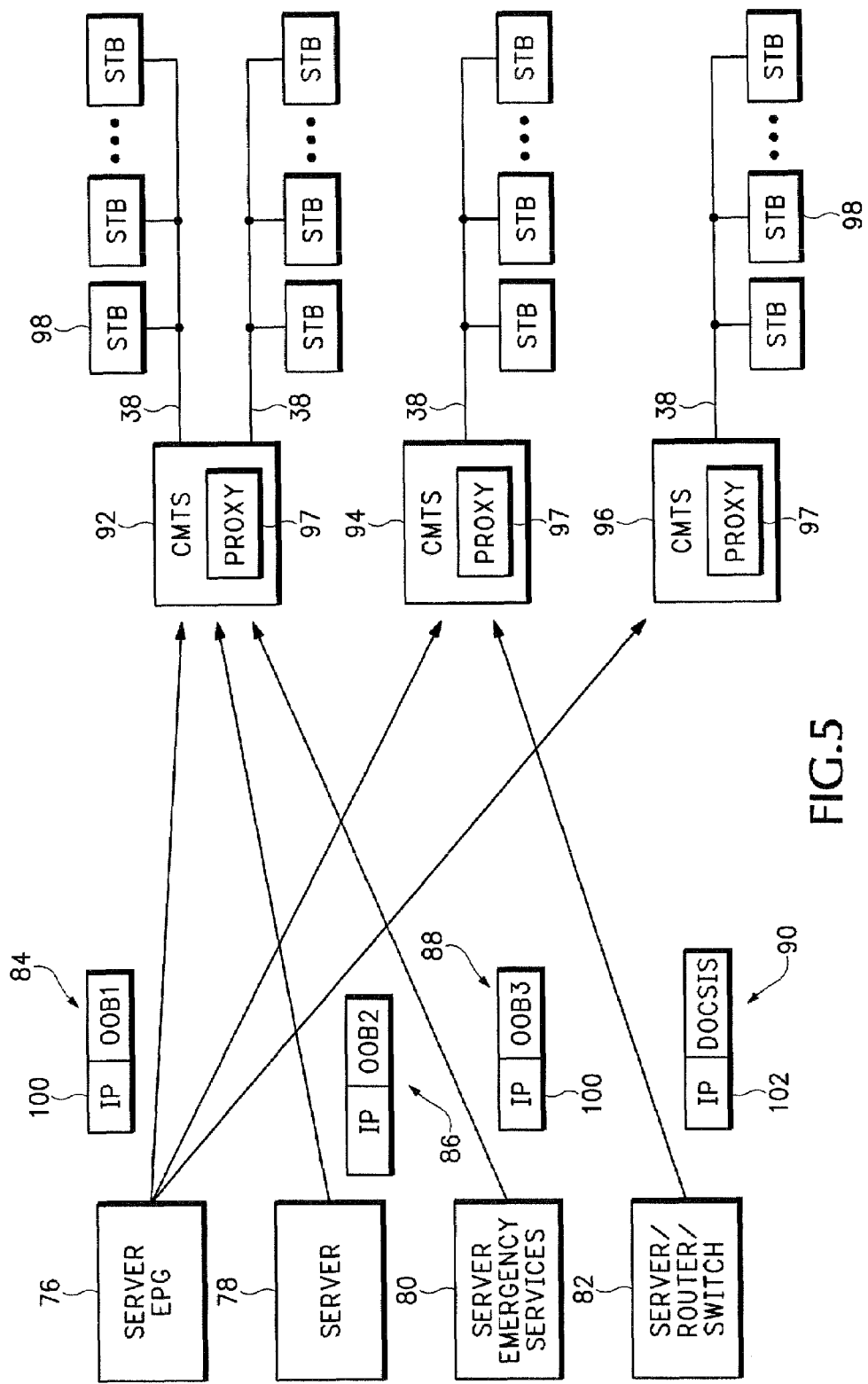
FIG. 5 is a block diagram showing how the proxy scheme is used with different servers and other network processing devices.

FIG. 5 shows how the proxy 97 can be used for receiving OOB messaging from multiple servers 76-82. Each server 76-82 may be used for a different OOB messaging service. For example, server 76 may be used for an electronic programming guide (EPG) service and server 80 may be used for an emergency notification service. Certain servers 76-82 may be used for particular geographic locations and other servers 76-82 may be used for updating or notifying STBs 98 in multiple geographical locations. It is also possible that the same server 76-82 provides multiple OOB services.

In one example, the server 76 sends IP packets 84 that include OOB messaging OOB1 using an IP address 100. The packet 84 may be a multicast packet that is transmitted to multiple CMTSs 92-96 at the same time. Alternatively, the packet 84 may be a unicast packet that is sent to only one CMTS at a time. Other servers, such as server 80, may send packet 88 using the same IP address 100 used by server 76, or may use a different IP address.

The proxy 97 in each of the CMTSs 92-96 determine which of the IP addresses in packets 84-90 require insertion of a well-known Ethernet address. These packets are encapsulated with Ethernet frames including an associated well-known Ethernet address.

Another server, router, or switch 82 may send general DOCSIS IP packets 90 to one or more of the CMTSs 92-96. In this case, the IP address 102 in packet 90 is not associated with OOB messaging. The proxy 97 treats the packet as a conventional DOCSIS IP packet and does not replace the Ethernet address in the packet 90 with a well-known Ethernet address. The packet 90 is formatted by the CMTS with the necessary DOCSIS header for reaching the computer corresponding with the IP address 102.

To prevent unauthorized packets from being sent to the STB 98, a secure tunnel can be used between the servers 76-82 and the CMTSs 92-96. For example, the proxy 97 in each CMTS 92-96 detects packets with one of the IP destination addresses associated with out of band messaging. The proxy 97 discards the packet if the source IP address does not match a preauthorized address. The proxy scheme described above can be used for any endpoints in a cable network that need to receive data from outside the cable system.

Figure 6:
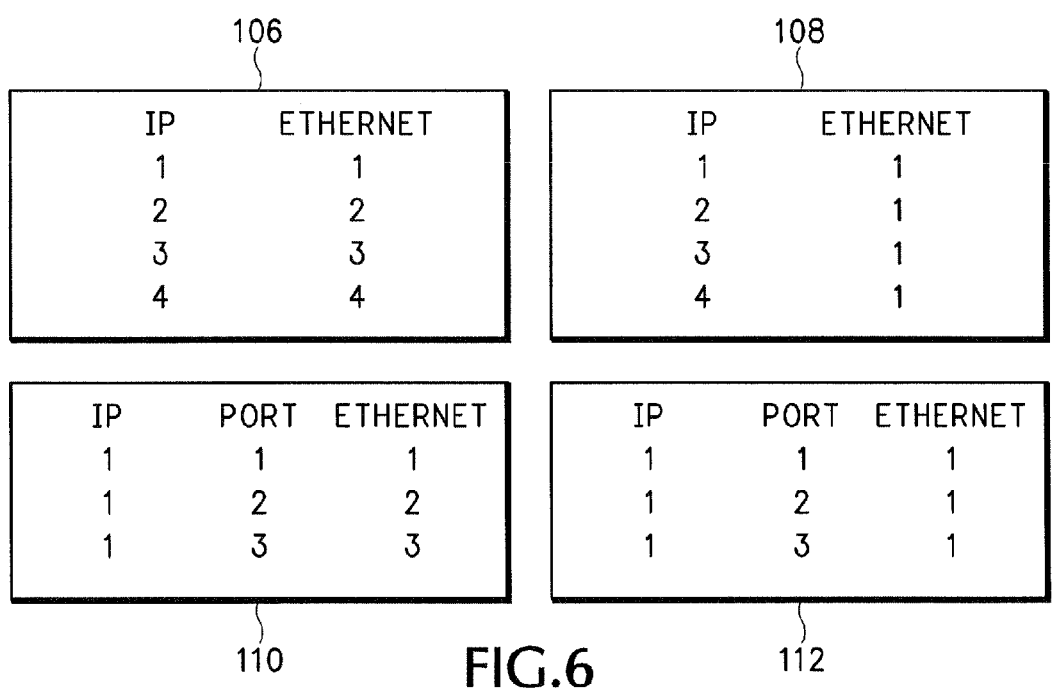
FIG. 6 is a diagram showing how different lookup tables are used in the proxy scheme for establishing different Ethernet tunnels over the cable network.

Referring to FIG. 6, there can be different addressing schemes used for sending different OOB messages over different Ethernet tunnels. To accommodate different downstream tunneling schemes, different lookup tables 106-112 are used by the proxy 97 (FIG. 5) to determine where and how to forward OOB packets.

In one example, table 106 contains multiple destination IP addresses each associated with a different well-known Ethernet address. The proxy 97 (FIG. 5) uses table 106 to detect IP packets containing any of the listed IP addresses. The proxy 97 establishes a different Ethernet tunnel for each of the IP addresses. The proxy 97 encapsulates the received IP packet in an Ethernet frame containing the Ethernet address corresponding with the received IP address. The encapsulated OOB packet is then processed by the STBs 98 (FIG. 5) that have been initialized to receive the particular well-known Ethernet addresses added to the IP packet.

Table 108 associates the same well-known Ethernet address with different destination IP addresses. Table 108 can be used when different multicast of unicast destination IP addresses are used for sending OOB messaging over the same downstream Ethernet tunnel. The messages in the packets with the different IP addresses will then be received by the same STBs. In one implementation, the different IP addresses in the encapsulated packets are used at the STBs to determine how the packets should be further processed.

Table 110 associates different port numbers with different well-known Ethernet addresses. Table 112 associates different port numbers with the same well-known Ethernet address. The proxy 97 (FIG. 5) uses the IP address to determine which packets to encapsulate with well-known Ethernet addresses. The proxy identifies the particular well-known Ethernet address to attach to the packet according to the part number. Alternatively, the STBs or DOCSIS cable modems at the client locations interpret the individual port numbers in the encapsulated packets to determine where and how to process the OOB messages in the packet payload. The proxy can use any combination of the tables in FIG. 6 for forwarding packets to endpoints in the cable network.

The proxy addressing scheme defines a new transport path in the cable network without redefining any signaling protocols and provides an attractive migration path for moving signaling from OOB channels onto DOCSIS. The proxy scheme allows DOCSIS to replace the one-way OOB channel to the STB.

One-way broadcasting to all STBs can be used for sending any IP traffic including Hyper-text transfer protocol (HTTP), Real time transport protocol (RTP) along with the electronic program guide (EPG). The proxy scheme is also compatible with two-way unicast DOCSIS sessions to individual STBs. The proxy scheme provides a minimum of disruption to IP, DOCSIS, and proprietary protocols. Security can be supported through the use of IPSec on the IP backbone.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for transmitting data over a cable network, comprising:
receiving packets having a first address;
using the first address as a proxy address for identifying a second address associated with clients in the cable network;
establishing a tunnel in the cable network by attaching the second address to the packets; and
sending the packets through the tunnel in the cable network to the clients, wherein the sending of the packets comprises sending both Data Over Cable Service Interface Specifications (DOCSIS) IP packets directed to a cable modem and out of band message packets directed to a Set Top Box (STB) over a same channel in the cable network to the same cable modem.

2. A method according to claim 1 including sending the packets to the clients over a one-way cable plant.

3. A method according to claim 1 including using the first and second address for sending packets containing out of band cable messaging to the clients in the cable network.

4. A method according to claim 1 including receiving multicast packets or unicast packets containing the first address.

5. A method according to claim 1 including sending the packets to clients containing set top boxes that operate in a one-way cable network and a two-way cable network.

6. A method for transmitting data over a cable network, comprising:
receiving packets having a first address;
using the first address as a proxy address for identifying a second address associated with clients in the cable network;
establishing a tunnel in the cable network by attaching the second address to the packets;
sending the packets through the tunnel in the cable network to the clients; and
encapsulating the packets by replacing an Ethernet address in the packets with a well-known Ethernet address preconfigured into the clients.

7. A method for transmitting data over a cable network, comprising:
receiving packets having a first address;
identifying different first addresses for packets containing different out of band cable messages;
identifying different Ethernet addresses with the identified different first addresses;
using the identified different first addresses as proxy addresses for identifying the different Ethernet addresses associated with clients in the cable network;
establishing a tunnel in the cable network by attaching the identified different Ethernet addresses to the packets containing different out of band cable messages; and
sending the packets containing different out of band cable messages through the tunnel in the cable network to the clients.

8. A method for transmitting data over a cable network, comprising:
receiving packets having a first address;
using the first address as a proxy address for identifying a second address associated with clients in the cable network by identifying different port numbers associated with the first address;
attaching different Ethernet addresses to the packets associated with the different port numbers;
establishing a tunnel in the cable network by attaching the second address to the packets; and
sending the packets through the tunnel in the cable network to the clients.

9. A cable device, comprising:
a first interface configured to receive packets;
a processor configured to detect packets having an IP proxy address, the processor attaching a second different Ethernet address to the detected packets that is preconfigured into cable clients and allow the packets with the attached second different Ethernet address to be transmitted over a one-way cable system to the cable clients; and a second interface configured to send the packets with the attached second different Ethernet address over the cable system to the cable clients, wherein the sending of the packets with the attached second different Ethernet address comprises sending both Data Over Cable Service Interface Specifications (DOCSIS) IP packets directed to a cable modem and out of band message packets directed to a Set Top Box (STB) over a same channel in the cable system to the same cable modem.

10. A cable device according to claim 9 wherein the first interlace is coupled to an IP network.

11. A cable device according to claim 10 wherein the first interface receives unicast or multicast packets containing the IP proxy address.

12. A cable device according to claim 9 wherein the processor establishes an Ethernet broadcast pipe in the cable system by encapsulating the detected packets with an Ethernet frame containing the second address.

13. A cable device according to claim 9 including a look-up table that associates different IP proxy addresses with the same or different Ethernet addresses.

14. A cable device, comprising:
a first interface configured to receive packets;
a processor configured to detect packets having an IP proxy address, the processor attaching a second address to the detected packets that allow the IP packets to be transmitted over a one-way cable system to cable clients;
a second interface configured to send the received packets over the cable system to the cable clients; and
a lookup table that contains different port numbers for the IP proxy address and associates the same or different Ethernet addresses with the different port numbers.

15. A cable device, comprising:
a processor configured to detect packets having a first predetermined address and in response to identifying the predetermined address use a second address that is preconifgured into cable modems for transmitting the detected packets over a cable interface to one or more of the cable modems; and
the second address when transmitted in the detected packets causing the one or more cable modems to redirect out of band cable messaging in the detected packets to a Set Top Box (STB).

16. The cable device according to claim 15 wherein the processor sends packets containing the out of band cable messaging directed to the set top box over a Data Over Cable Service Interface Specifications (DOCSIS) channel to the one or more cable modems for forwarding to the set top box and also sends IP packets directed to an IP endpoint over the same DOCSIS channel to the same one or more cable modems.

* * * * *

UNITED STATES PATENT AND TRADEMARK OFFICE
CERTIFICATE OF CORRECTION

| | | |
|---|---|---|
| PATENT NO. | : 7,324,515 B1 | |
| APPLICATION NO. | : 10/109456 | |
| DATED | : January 29, 2008 | |
| INVENTOR(S) | : John T. Chapman | |

It is certified that error appears in the above-identified patent and that said Letters Patent is hereby corrected as shown below:

Column 10, Line 13, delete "preconifgured" and insert -- preconfigured --, therefor.

Signed and Sealed this

Twenty-second Day of December, 2009

David J. Kappos
*Director of the United States Patent and Trademark Office*